US006125126A

United States Patent [19]
Hallenstål

[11] Patent Number: 6,125,126
[45] Date of Patent: Sep. 26, 2000

[54] METHOD AND APPARATUS FOR SELECTIVE CALL FORWARDING

[75] Inventor: Magnus Hallenstål, Täby, Sweden

[73] Assignee: Telefonaktiebolaget LM Ericsson, Stockholm, Sweden

[21] Appl. No.: 08/856,077

[22] Filed: May 14, 1997

[51] Int. Cl.[7] .............................. H04L 12/28; H04M 3/42
[52] U.S. Cl. ..................... 370/522; 370/401; 370/259; 379/211; 455/461
[58] Field of Search ..................... 370/352–356, 370/401, 522, 259; 379/210, 211, 201, 84, 88.23; 455/461

[56] References Cited

U.S. PATENT DOCUMENTS

| | | | |
|---|---|---|---|
| 5,243,645 | 9/1993 | Bissell et al. | 379/211 |
| 5,272,749 | 12/1993 | Masek | 379/216 |
| 5,353,331 | 10/1994 | Emery et al. | 455/461 |
| 5,384,831 | 1/1995 | Creswell et al. | 379/88.26 |
| 5,394,464 | 2/1995 | Hanson et al. | 379/201 |
| 5,541,983 | 7/1996 | Rose | 379/201 |
| 5,557,668 | 9/1996 | Brady | 379/212 |
| 5,583,564 | 12/1996 | Rao et al. | 348/14 |
| 5,592,541 | 1/1997 | Fleischer, III et al. | 379/211 |
| 5,729,599 | 3/1998 | Plomondon et al. | 379/211 |
| 5,754,630 | 5/1998 | Srinivasan | 379/88.23 |
| 5,805,587 | 9/1998 | Norris et al. | 370/352 |
| 5,812,639 | 9/1998 | Bartholomew et al. | 379/89 |
| 5,818,919 | 10/1998 | Berberich et al. | 379/211 |
| 5,915,008 | 6/1999 | Dulman | 379/201 |
| 5,999,525 | 12/1999 | Krishnaswamy et al. | 370/352 |

FOREIGN PATENT DOCUMENTS

| | | |
|---|---|---|
| 0 696 146 | 2/1996 | European Pat. Off. . |
| 0 740 480 A2 | 10/1996 | European Pat. Off. . |
| 2290434 | 12/1995 | United Kingdom . |
| 95/31076 | 11/1995 | WIPO . |

OTHER PUBLICATIONS

BT Technology Journal, R. Rabbage et al., "Internet Phone–Changing the Telephony Paradigm?", vol. 15, No. 2, Apr. 1997, pp. 145–157, XP000676853.

Primary Examiner—Hassan Kizou
Assistant Examiner—John Pezzlo
Attorney, Agent, or Firm—Nixon & Vanderhye P.C.

[57] ABSTRACT

The present invention provides a selective automatic call forwarding method and system. In response to a request from a subscriber for the selective call forwarding service, a selective call forwarding service record is created for the subscriber which includes the subscriber's telephone number, a "trigger" telephone number, and a call forwarding number associated with the trigger number. An example of the trigger number might be the subscriber's Internet access telephone number. An example of the call forwarding number might be the subscriber's mobile telephone number. A determination is made, e.g., a flag is set in the subscriber record, whenever the subscriber is engaged in a communication initiated to the trigger number. Thereafter, incoming calls directed to the subscriber are automatically forwarded to the call forwarding number. However, if the subscriber is currently engaged in a communication with a telephone number other than the trigger number registered in the subscriber's call forwarding service record, incoming calls are handled in a manner other than forwarding the incoming call to the call forwarding number. Such other procedures might include, for example, generation of a busy signal, execution of a call waiting service, or execution of a call completion service.

49 Claims, 5 Drawing Sheets

METHOD AND APPARATUS FOR SELECTIVE CALL FORWARDING

FIELD OF THE INVENTION

The present invention relates to communications networks and more particularly, to providing a selective automatic call forwarding service to communication network subscribers.

BACKGROUND AND SUMMARY OF THE INVENTION

As telephony continues to merge with computers with "telecommunications" now supporting both voice and data communications, new challenges and opportunities are presented. For example, telephone subscribers in the past simply used their telephone line for voice communication from a telephone. Today, a telephone subscriber often uses his telephone line for both voice and data communications. As a result, there is a good chance that an incoming call intended for that subscriber will find the line busy either with a traditional voice telephony communication or with a data communication. Data communications may be particularly problematic because a subscriber may connect himself to an external communications network, such as the Internet, for an extended time period as anyone who has become addicted to Internet "surfing" will attest One problem then is how to contact such a subscriber when he is surfing on the Internet.

In a pure telephony environment, if a subscriber is engaged in extended telephone conversations, he can anticipate problems others will have in reaching him by subscribing to a call waiting service. Consequently, when the subscriber is talking on the telephone, the presence of an incoming call is indicated in some detectable fashion to the subscriber. The subscriber may then momentarily interrupt his current conversation to take the incoming call to determine the identity of the incoming caller and decide which call to take. Another solution is to subscribe to a call completion service which continuously tries to complete a call between the two parties when the telephone line of the called party is busy.

But these two solutions are limited. For example, call completion services typically time out if the called party is busy more than thirty minutes. After thirty minutes on the Internet, some surfers are just warming up. A problem with call waiting is that it is not well adapted to data communications. It is not a problem to interrupt a typical voice communication briefly with an incoming second call, aside from some mild distraction to the earlier caller. This is not the case with data communications. A call waiting signal during a data communication would completely disrupt the data session being conducted over the subscriber's telephone line.

Accordingly, the problem is one of how to establish communication with a party who is engaged, for example, on an extended data communication without having to resort to traditional call waiting or call completion options and their respective shortcomings. Call forwarding is a possible solution. Call forwarding is a known technique where a subscriber who will be away from his telephone or does not want to be interrupted redirects calls to another telephone. However, conventional call forwarding is an inflexible service. Once a subscriber specifies a forwarding number to which the subscriber's calls are to be forwarded, all of the subscriber's call are forwarded to that number. If the subscriber wants to take some calls and forward others, he must remember to manually activate and deactivate the call forwarding service at the appropriate times. Manual activation and deactivation is inconvenient and subject to subscriber memory/discipline. Moreover, call waiting and/or call completion services may conflict with call forwarding.

What is needed is a selective call forwarding approach that specifically permits a subscriber to selectively but still automatically is forward telephone calls to another number when the subscriber is engaged in specific, selected communications. For example, it would be desirable to permit a user to selectively divert incoming calls to an alternative number only when the subscriber is engaged in a data communication. Typically, data communications are limited to specific telephone numbers such as an Internet access number and/or a particular telephone number that the subscriber commonly employs for data communications. What is needed is a service that permits a user to identify one or more outgoing telephone numbers, which when engaged by the subscriber, automatically cause incoming calls to the subscriber to be forwarded to a prescribed forwarding number such as the subscriber's mobile telephone number. This selective call forwarding would prevent disruption of the data communication and still permit the subscriber to be reached by incoming callers. Such call forwarding should take place automatically so that the subscriber does not have to manually forward his calls each time he desires calls to be forwarded, e.g., each time he decides to take an Internet session.

The problems noted above are addressed and resolved by employing selective call forwarding method and system in accordance with the present invention. In response to a request from a subscriber for the selective call forwarding service, a selective call forwarding service record is created for the subscriber which includes the subscriber's telephone number, a "trigger" telephone number, and a call forwarding number associated with the trigger number. An example of the trigger number might be the subscriber's Internet access telephone number. An example of the call forwarding number might be the subscriber's mobile telephone number.

A determination is made, e.g., a flag is set in the subscriber record, whenever the subscriber is engaged in a communication initiated to the trigger number. Thereafter, incoming calls directed to the subscriber are automatically forwarded to the call forwarding number. However, if the subscriber is currently engaged in a communication with a telephone number other than the trigger number registered in the subscriber's call forwarding service record, incoming calls are handled in a manner other than forwarding the incoming call to the call forwarding number. Such other procedures might include, for example, generation of a busy signal, execution of a call waiting service, or execution of a call completion service.

Conveniently, the subscriber can subscribe to the service, provide the necessary information to implement the service, and activate/deactivate the service via a standard DTMF telephone set. Voice prompts may be employed to prompt the subscriber to enter the necessary information by pressing DTMF buttons on a telephone set. More than one trigger number and corresponding call forwarding number can be recorded in the subscriber's selective call forwarding record. In other words, if the subscriber is currently engaged in a communication involving a second trigger number recorded in the subscriber's record, an incoming call directed to the subscriber is automatically forwarded to the second call forwarding number stored in the subscriber's record as corresponding to the second trigger number. While the first and second call forwarding numbers may be different, e.g., one to the subscriber's mobile telephone number and the other to the subscriber's voice mailbox, they may also be the same, e.g., all selectively forwarded calls are routed to the subscriber's mobile telephone.

The present invention may be implemented in a number of environments including a traditional public switch telephone network (PSTN) as well as in an intelligent network (IN). In a traditional PSTN, the selective call forwarding service may be implemented in a local switching node such as the local exchange connected to the subscriber's communication line. A computer in the local exchange stores the selective call forwarding records for various subscribers in a database and implements the selective call forwarding service following programmed instructions stored in a program memory. A significant advantage of this implementation is that no new hardware is needed at the local exchange since the necessary computer and switching hardware are already in place in modem digital exchanges.

The present invention may also be implemented in an "intelligent" communications network which includes a switching node detecting one or more trigger conditions and a control node cooperatively connected to the switching node making the necessary call control decisions. When the switching node detects that an incoming call is directed to a selective call forwarding subscriber number, the switching node requests call handling instructions from the control node. The control node instructs the switching node to route the incoming call to a first call forwarding number established for the subscriber only if the subscriber is engaged in a communication involving a trigger telephone number associated with the call forwarding number. If the subscriber is not engaged in a communication involving the trigger telephone number, the control node instructs the switching node to take some other action other than routing the incoming call to the corresponding forwarding number. An intelligent network implementation is quite flexible and is easily incorporated with a wide variety of services already provided by existing intelligent networks.

These and other objects and features of the present invention will now be disclosed in further detail in conjunction with the attached drawings and detailed description of the invention set forth below.

DETAILED DESCRIPTION OF INVENTION

In the following description, for purposes of explanation and not limitation, specific details are set forth, such as particular embodiments, components, interfaces, hardware configurations, data structures, software flows, techniques, etc. in order to provide a thorough understanding of the present invention. However, it will be apparent to one skilled in the art that the present invention may be practiced in other embodiments that depart from these specific details. In other instances, detailed descriptions of well known methods, devices, and components are omitted so as not to obscure the description of the present invention with unnecessary detail.

Of course, there are many well known means for coupling telephone calls between various telecommunication devices including telephones, computers, facsimile machines, voicemail machines, intelligent peripherals, etc. The present invention is not limited to any particular coupling mechanism and could be used with standard telephone lines, coaxial cable, fiber optic lines, RF links, etc. It should also be noted that a call connection can include traditional telephony type voice and modem type data communications as well as more modem digital communications, e.g., packetized data, etc.

Figures 1, 2:
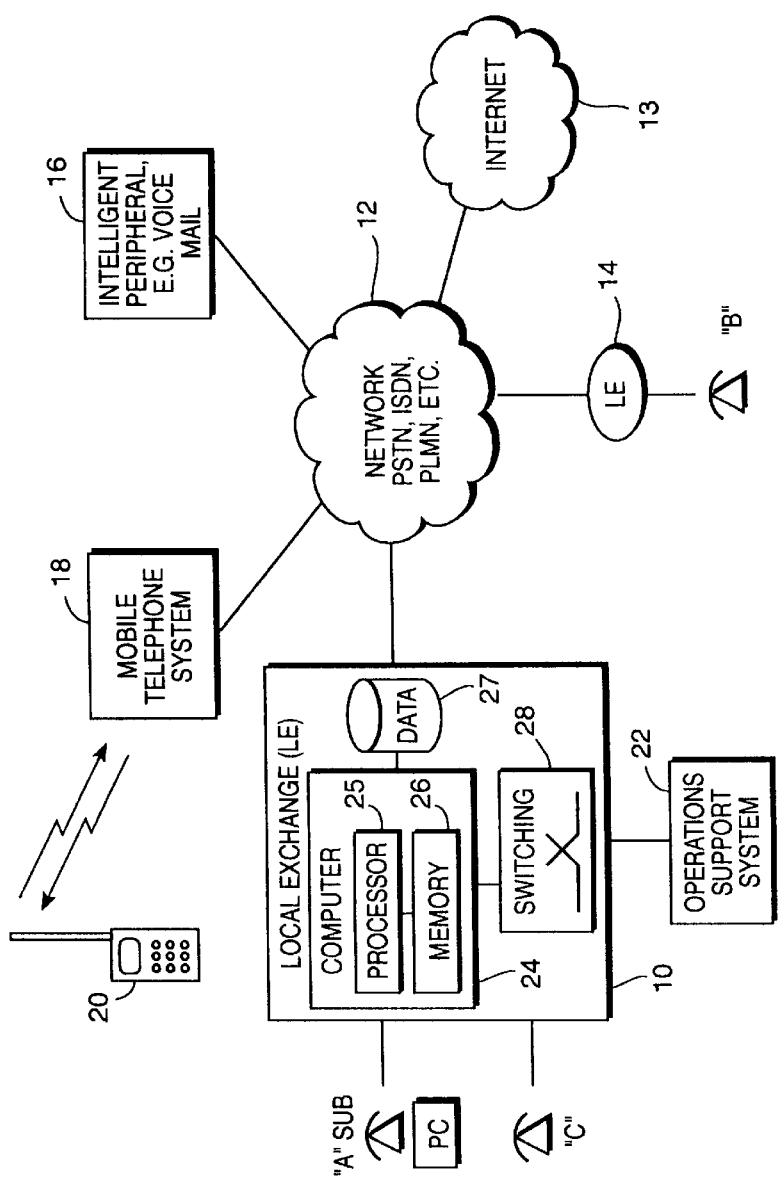
FIG. 1 is a block diagram of an example communications system suitable for implementing the present invention.
FIG. 2 is an illustration of an example selective call forwarding subscriber record.

FIG. 1 is a diagram of a communications system where "A" and "C" telephony subscribers are connected to a communications network 12 by way of a local exchange (LE) 10. The communications network 12 includes the public switched telephone network (PSTN) and may also incorporate other networks including the integrated services digital network (ISDN), the public land mobile radio network (PLMN), etc. The communications network 12 is also connected to various other subscribers such as subscriber "B" connected via another local exchange (LE) 14. The PLMN portion of communications network 12 interfaces with a mobile telephone system 18 which controls mobile communications between various mobile radios 20 and subscribers of the wireline network 12. A variety of other devices may be connected to the communications network 12 such as an intelligent peripheral 16, which in the illustrated example, may be a messaging center used to provide voicemail services to subscribers A conventional operation support system (OSS) 22 is shown connected to the local exchange 10.

The local exchange 10 includes a computer 24 connected to conventional switching circuitry 28 and database 27. The computer includes one or more data processors 25 and one or more memories 26 for storing program and data information. One preferred example of such a local exchange is implemented using the Ericsson AXE-10 switch. The computer 24 controls the numerous operations performed in the local exchange such as call signaling, call routing, call charging, etc. One of the advantages of the present invention is that it may be implemented in a local exchange using the existing hardware 24–28 simply by adding the necessary software programs and data structures as described in more detail below For purposes of illustration, party A is a subscriber to the selective call forwarding service. In a classic example in which the present invention may be advantageously employed, subscriber A is engaged in a data communication using the Internet 13 via a call connection established by local exchange 10 through communications network 12. While subscriber A is "surfing" on the Internet 13, calling party B initiates an incoming call through local exchange 14 to subscriber A via the communications network 12 and local exchange 10 Subscriber A may only have one communications wire to the local exchange (although not necessarily so) even though the subscriber may have two communications devices including a traditional telephone set and a personal computer.

The problem described above in the background occurs when subscriber A is surfing on the Internet 13 using his PC and caller B is trying to reach subscriber A while subscriber A's telephone line is occupied with data flowing between the Internet 13 and subscriber A's PC. Subscriber A may not want his Internet session interrupted, but he still may want to be able to take B's telephone call, for example, on his mobile telephone 20 which he may have on his person. Alternatively, subscriber A may want to have the incoming call (1) routed to his voice mailbox at intelligent peripheral 16, (2) routed to a second line if he has two telephone lines, (3) forwarded to a colleague, receptionist, or neighbor represented by party C in FIG. 1, etc.

Of course, there may be a number of call connections for which subscriber A does not want to trigger call forwarding when subscriber A's line is busy. For example, subscriber A's usual voice conversations may be relatively brief, and even if conversations are lengthy, they can be interrupted using conventional call waiting services. Accordingly, a selective automatic call forwarding service in accordance with the present invention gives the subscriber extreme flexibility in determining when calls are automatically forwarded and when they are not automatically forwarded.

Potential subscribers may call an "800" number (or some other number) associated with various telephony services to which customers of the communications system may subscribe including the selective automatic call forwarding service. When a potential subscriber requests the selective call forwarding service, the computer 24 in the local exchange 10 generates a selective automatic call forwarding subscriber record 30 such as the example record shown in FIG. 2. The computer 24 records the subscriber's telephone number as the subscriber identification (ID) in field 32 of the subscriber record 30. Through a series of voice prompts transmitted to the subscriber's telephone, the computer 24 prompts the subscriber to enter various data used to fill in the remaining fields of the subscriber record 30. Such voice prompts may be generated by a live operator or by an interactive voice response (IVR) type device. For example, the computer may prompt the operator to enter a security code such as a PIN number shown in field 34 which is optionally although preferably employed to authenticate the activation, deactivation, and/or modification of the subscriber record. The subscriber may enter information, like the PIN number, by pressing appropriate DTMF buttons on his telephone keypad. Alternatively, the user could subscribe to the service and provide the necessary information via an interactive session between the subscriber's PC and the computer 24.

Subscribers may also activate the selective automatic call forwarding service by entering a keypad code sequence followed by a trigger number and a call forwarding number. For example, the keypad sequence for controlling the selective call forwarding sequence entered by the subscriber might be: *42*123456*567890#. In this example, "42" would be the selective call forwarding code, "123456" would be the trigger number, and "567890" is the call forwarding number While the service may be completely automated, it may preferable in some circumstances to have the service provider involved in the procedure. For example, the subscriber calls an operator service number and interacts with a human operator to initiate and/or change the service with the human operator making the necessary changes in that subscriber's service data record Other information obtained from the subscriber to set up the subscriber's record includes determining whether the subscriber desires to have the service currently activated (recorded in field 36). The subscriber is prompted to enter one or more trigger numbers to be entered in field 40 and a call forwarding number corresponding to each trigger number entered in field 42. When the subscriber is engaged in communication involving a trigger number that "triggers" the activated service to selectively forward incoming calls to the corresponding call forwarding number. The trigger flag in field 38 may be set by the computer 24 whenever the A subscriber is engaged in a communication with one of the trigger numbers in field 40. Absent setting of the trigger flag, automatic call forwarding is not performed.

Figure 3:
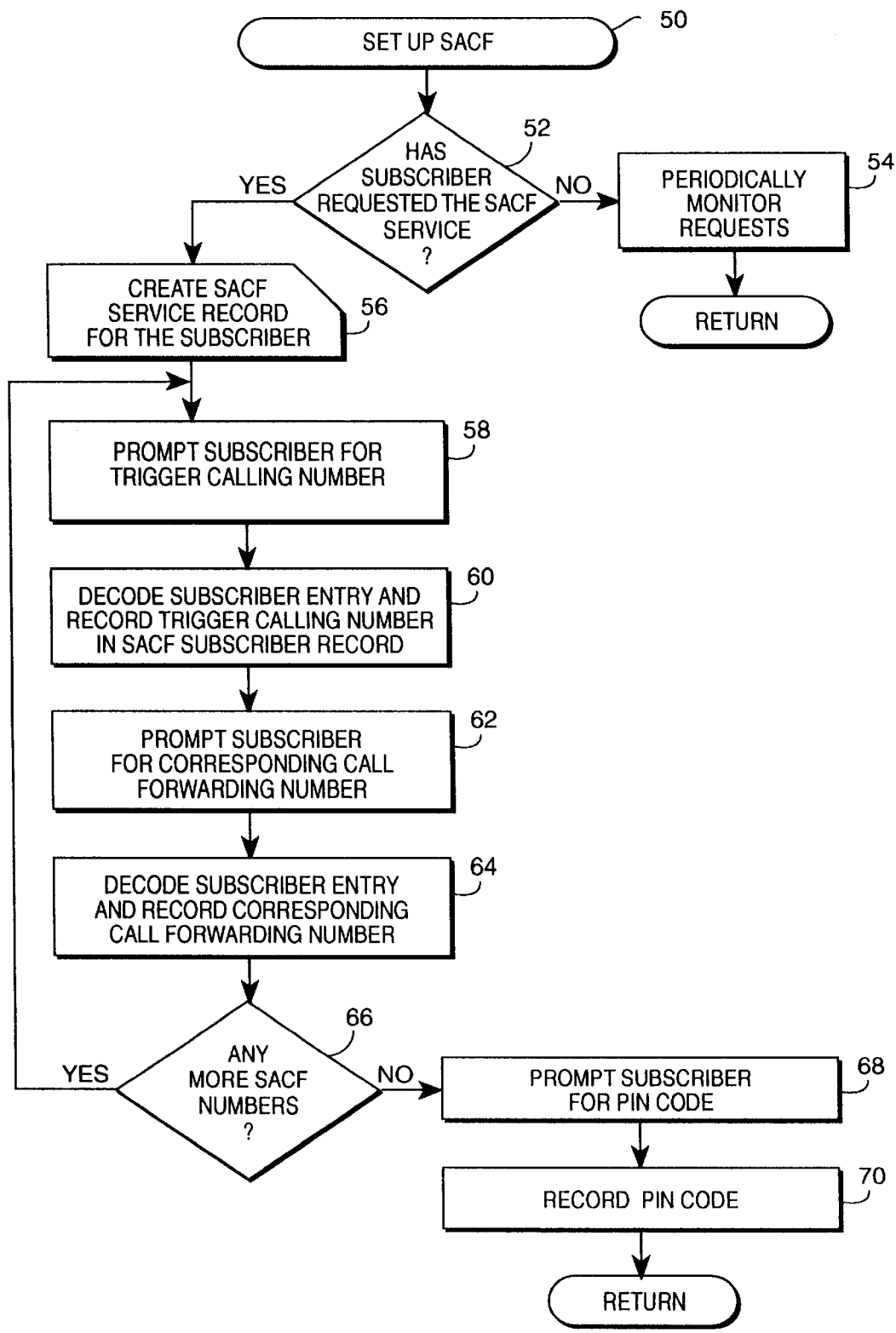
FIG. 3 is a flowchart diagram illustrating example software procedures for implementing setup of the selective call forwarding service.

More detailed description of the procedures followed by computer 24 will now be described in conjunction with the flow diagram of the example software procedures illustrated in FIG. 3. The control routine 50, entitled "Set up Selective Automatic Call Forwarding (SACF)," commences with a decision (block 52) whether a subscriber has requested a subscription to the selective automatic call forwarding service. In this example embodiment, such a request may be made by the subscriber using his telephone or personal computer dialing to a special toll-free number established for service requests. Periodic monitorings for such requests are made until a request is received (block 454).

Once a request is received for the selective automatic call forwarding service, computer 24 creates a selective automatic call forwarding service record for that subscriber (block 56) and stores that record in the database 27. Computer 24 prompts the subscriber to enter on his DTMF keypad of his telephone or the keyboard of his PC a trigger number (block 58). Computer 24 receives and decodes the subscriber's entry, e.g., converts DTMF tones into an appropriate binary representation of the corresponding numerical digit, and records the trigger calling number in the trigger number(s) field 40 of the SACF subscriber record (block 60). Trigger numbers may include telephone numbers which a subscriber might use for lengthy communication engagements, e.g., an Internet Access number, a facsimile number, or a telephone number to access the local area network (LAN) where the subscriber works. The latter examples are particularly relevant to persons who work from their homes or in satellite offices. Computer 24 also prompts the subscriber to enter a call forwarding number corresponding to the just recorded trigger number (block 62). The call forwarding number may be as mentioned above the subscriber's mobile telephone number, a voice mail telephone number, a second subscriber telephone line, the telephone number of a colleague, friend, or receptionist, etc.

A decision is made in block 66 whether the subscriber desires to enter any more SACF numbers. The SACF subscriber record may include plural triggering number-call forwarding number pairs. As a result, an incoming call may be routed to different telephone numbers depending upon the triggering number with which the subscriber is currently communicating. Alternatively, plural triggering numbers may all correspond to a single forwarding number.

A preferable, but optional security feature is provided in block 68 with the subscriber being prompted for entry of a PIN or other security code. The entered security code is then recorded in field 34 of the is SACF subscriber record 30. This security measure is useful to ensure that the SACF service is not inadvertently or wrongly activated, deactivated, or modified.

Figure 4:
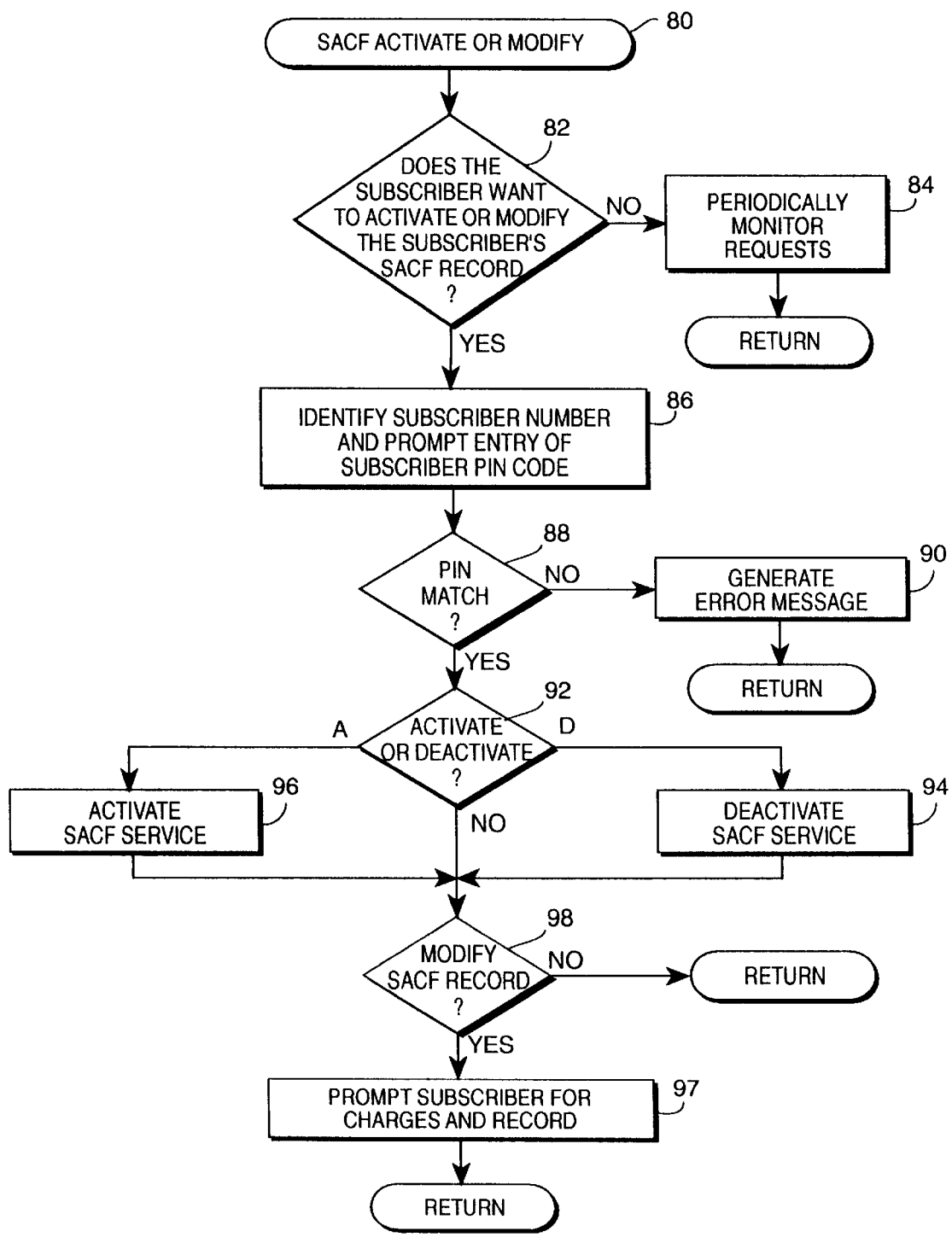
FIG. 4 is a flowchart diagram illustrating example software procedures for activating, deactivating, and/or modifying a selective call forwarding subscriber record.

Once the SACF subscriber record 30 is generated and stored in the database 27, the subscriber may wish to activate, deactivate, or modify the SACF service record. The computer 24 processes such subscriber requests following the example SACF Activate or Modify routine 80 illustrated in flowchart form in FIG. 4. Initially, computer 24 decides whether the subscriber wants to activate, deactivate, or modify the subscriber's SACF record in decision block 82. If not, the computer 24 periodically monitors for such requests (block 84). Assuming that the subscriber wants to take some kind of action with respect to the SACF record, computer 24 identifies the calling subscriber usually by the subscriber's telephone number/ID and retrieves the subscriber's SACF record from database 27 while prompting the subscriber to enter a subscriber PIN code (block 86). Computer 24 compares the subscriber's PIN number from field 34 of the retrieved database record with the entered PIN number to determine whether they match (block 88). If not, the computer generates an error message (block 90) which may for example direct the operator to reenter the PIN number, or if sufficient erroneous entries are detected, to redirect the caller to dial a service number to receive assistance. If the PINs match, a decision is made in block 92 whether the subscriber desires to activate or deactivate the SACF service. If activation is desired, computer 24 sets the active field 36 (block 96). If the user selects deactivation, the computer 24 sets an inactive flag in field 36 of the SACF record (block 94). Flow proceeds from blocks 94 and 96, or directly from decision block 92 if the user has not made activation/deactivation request, to decision block 98 where the computer 24 prompts the subscriber to modify the subscriber's SACF record (block 98). If there are no modifications to make, control is returned to a main application or operating system program. Otherwise, computer 24 prompts the subscriber for changes to the subscriber's SACF database record 30 and records those changes before returning the data record 30 to database 27.

Figure 5:
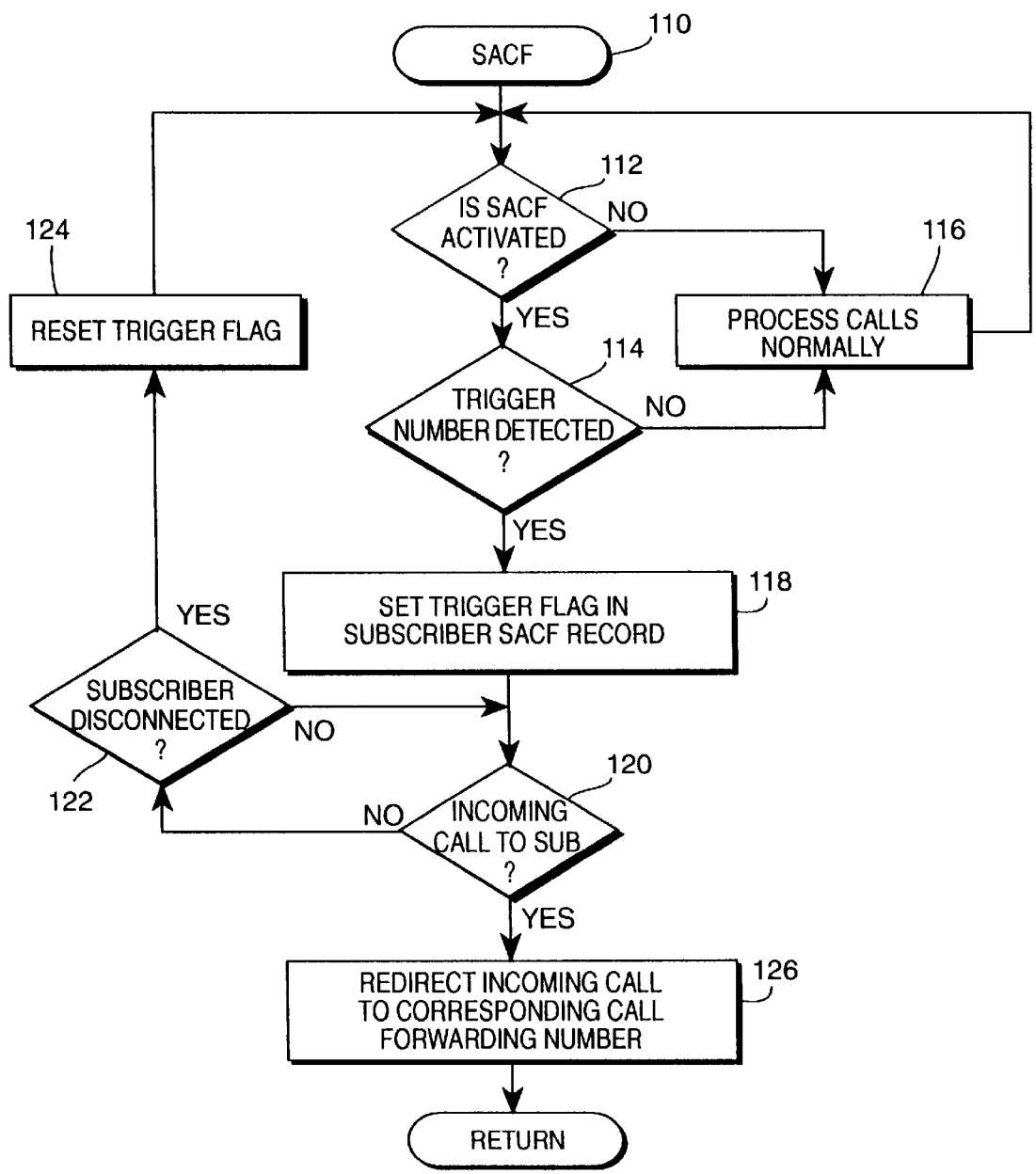
FIG. 5 is a flowchart diagram illustrating example software procedures for implementing the selective call forwarding service in accordance with one example embodiment of the present invention.

FIG. 5 illustrates example software procedures for implementing in one example embodiment a Selective Automatic Call Forwarding (SCAF) routine 110 in accordance with the present invention. Initially, a decision is made to determine whether the SACF service has been activated for this subscriber (block 112). If not, incoming calls to the subscriber are processed normally (block 116). This may include, for example, generating a busy tone when the subscriber is engaged in another communication, interrupting an ongoing call with some sort of call waiting indicator if the subscriber subscribes to a call waiting feature, performing a call completion service, etc. If the SACF service is activated, a decision is made in block 114 whether the subscriber is engaged with a communication involving a trigger number stored in field 40 of the subscriber SACF record 30. If not, calls are processed normally in block 116.

If a trigger number is i.e., the subscriber initiated an outgoing call to a trigger number or received an incoming call associated with one of the stored trigger numbers, computer 24 sets the trigger flag in field 38 in the subscriber's SACF record 30 (block 118). The computer 24 monitors for incoming calls to the subscriber (block 120). The computer 24 also monitors the subscriber's current call to determine whether it is disconnected (block 122). If the current trigger call is disconnected, the trigger flag is reset (block 124), and control returns to decision block 112. Otherwise, computer 24 continues to monitor for incoming calls. When an incoming call is received, the computer 24 redirects the incoming call to the call forwarding number stored in field 42 of the SACF subscriber record corresponding to the detected trigger number (block 126).

The selective automatic call forwarding service of the present invention is readily and economically implemented in existing local exchanges using existing computer processing and memory hardware and existing switching hardware 28 under the control of commands from computer 24. Another advantage is the selectivity of the service. Not all calls are automatically and uniformly routed to the same number irrespective of whether the subscriber is currently engaged in any call communication. The selectivity of the present invention allows calls to be forwarded only when the subscriber is involved in a call connection for one or more specific trigger numbers such as a data communication number, e.g., surfing on the Internet, or important voice calls where the subscriber does not want to be interrupted should the subscriber also have a call waiting service. The flexibility of the invention extends not only for the triggering condition but also to the call forwarding destination. The subscriber may want to have some calls immediately routed to him on his mobile telephone or another line so that he can immediately take the call while he may be engaged for example in an Internet session. Alternatively, the subscriber may not want to be interrupted on another call connection in which case the incoming call can be forwarded to the subscriber's voice mailbox.

Figure 6:
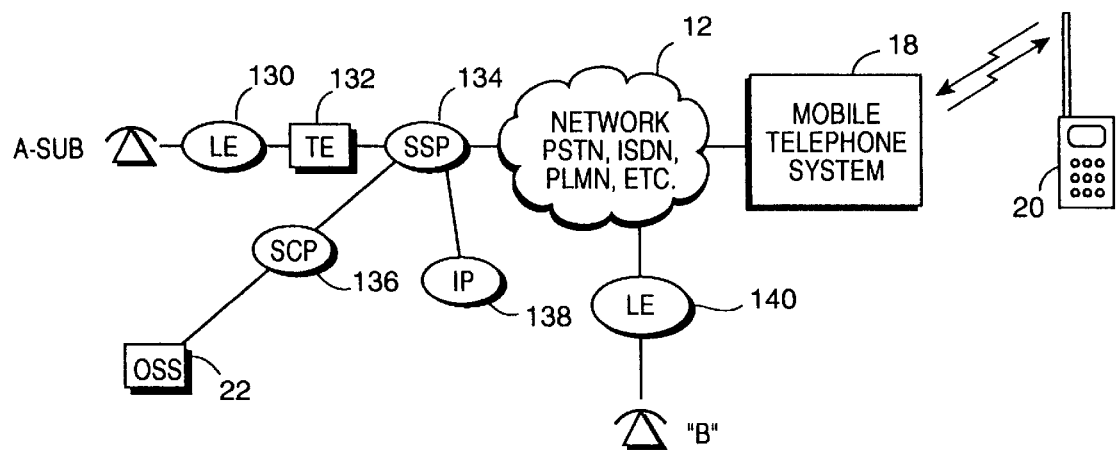
FIG. 6 is a block diagram of another example communications system including intelligent network components for implementing another embodiment of the present invention.

While the first example embodiment is implemented in a conventional local exchange in accordance with conventionally programmed routines, the present invention may also be implemented using an intelligent network (IN) architecture, an example embodiment of which is illustrated in function block format in FIG. 6. An intelligent network architecture superimposes on an existing telecommunications system a modular configuration of network elements which provide enhanced telecommunication services. Switching functions are performed by the base network in a conventional manner. For example, the A subscriber telephone line is connected to a local exchange 131 and optionally via a transfer exchange 132 to an intelligent network service switching point (SSP) 134. The SSP is a switch that recognizes service requests, requests call handling instructions from a service control point (SCP) 136, and executes those instructions to complete a telephone call.

More specifically, the SSP 134 provides intelligent network triggering to detect a condition which requires the SSP to initiate the intelligent network service by sending a query to the SCP 136. Each SACF subscriber has a specific trigger profile, i.e., a database record, which gives the subscriber access into the intelligent network functions. The SSP 134 formulates and transmits requests to the SCP 136 and processes and replies to requests from the SCP 136. In addition, the SSP 134 creates and plays intelligent network announcements formulated, for example, by the intelligent peripheral 138 and transmits various event messages to the SCP 136. Although not described in detail here, the SSP 134 is capable of functions other than those described above such as processing billing records for a call. The SCP 136 stores call control and call routing instructions to be executed by the SSP 134. The SCP 136 receives and processes event messages from the SSP 134 and formulates and sends responses to the SSP 134.

For the SCP to know what instructions to give the SSP for calls to subscriber A, it must know whether subscriber A is involved in a call with the triggering number. This knowledge is received from the SSP by query for instruction for all calls originating from subscriber A. The query does not result in any specific instructions and the call is continued as normal. However, the SCP can correctly process the SACF function.

When a call from party B intended for subscriber A is routed via local exchange 140 and communication network 12 to SSP 134, the SSP 136 detects when an incoming call is received for subscriber A. The SSP 134 then sends a query with other appropriate data regarding the call to the SCP 136. Based on the received information, the SCP accesses a database and executes a set of call processing instructions that correspond to the selective automatic call forwarding service for subscriber A. The SCP 136 then directs the SSP 134 to either connect the call to subscriber A if the subscriber is not currently involved in a communication with a trigger number, or alternatively, if subscriber A is involved in a communication with a trigger number, the SCP 136 instructs the SSP 134 to redirect the call to the call forwarding number corresponding to the current trigger number. The SCP 136 may instruct the intelligent peripheral 138 to supply interactive voice responses via the SSP 134 to and prompt a subscriber for the necessary information needed to implement that service. This second example embodiment has an advantage that it does not rely upon hard-coded programs and instead is implemented using modular service independent building blocks (SIB) that permit a great deal of service flexibility.

A specific implementation of the present in an Internet environment will now be described in accordance with the diagram of FIG. 7. In this embodiment, the subscriber A has both a personal computer 142 and a standard telephone handset 144 connected via a single telephone 146 or other wireline to a communications network 148 also connected to party B. An Internet service provider (ISP) 150 is connected to the communications network 148. The connecting point is sometimes referred to as the ISP's point of presence (PoP). In the figure, there are one or more servers for providing connecting subscriber personal computers to the Internet 150.

Users accessing the Internet 150 over a single line, dialed-up access have to choose between telephony and Internet access. As noted above, when logged on to the Internet, other parties cannot reach them on that phone line, and they cannot call anyone without dropping the Internet access. An Ericsson product called a "Phone Doubler" offers simultaneous Internet and telephony access over a single telephone line. The "Phone Doubler" uses a subscriber's standard audio equipment on a multimedia PC in conjunction with modern voice over Internet protocol technology implemented in a gateway between the PSTN and the Internet.

Figure 7:
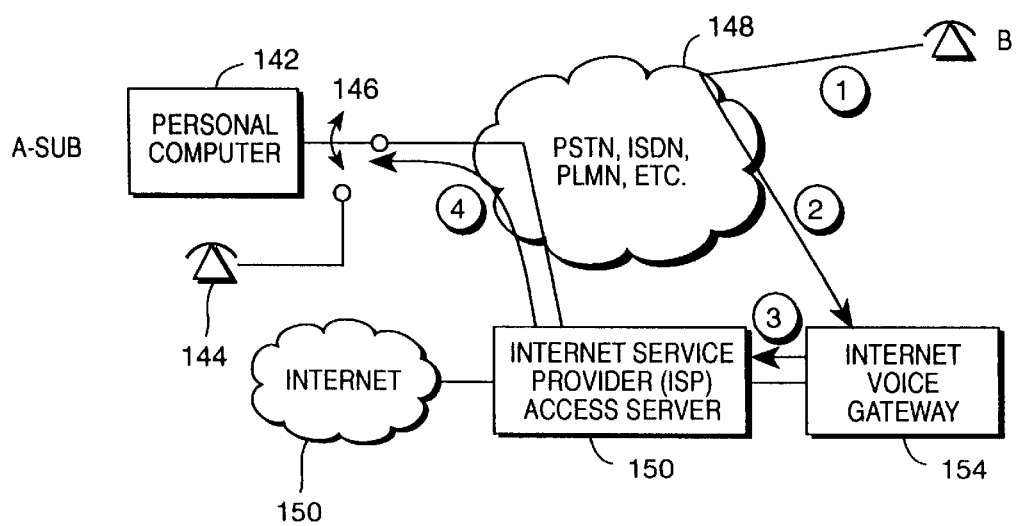
FIG. 7 is a block diagram of communications system illustrating yet another example application of the present invention.

As shown in FIG. 7, a call from party B routed via the PSTN type network 148 is redirected, using the selective automatic call forwarding features of the present invention, via an appropriate node in the network 148, e.g., a local exchange. In particular, the incoming call is redirected when personal computer 142 is connected to the Internet, the Internet access number being the trigger number for selective automatic call forwarding. In the Internet voice gateway 154, the A subscriber telephone number is translated into an Internet protocol (IP) address. The Internet voice gateway 154 also performs the necessary speech coding to adapt to the speed of the modem used by subscriber A in the dial-up connection to the Internet. The Internet voice gateway 154 then passes IP packets of speech over path "3" to the Internet Service Provider's (ISP's) access server 150 which routes those IP packets to the subscriber's personal computer using the PC's IP address. Subscriber A is notified on his personal computer screen when a call is coming in and can choose whether or not to take the call by pressing an on-hook/off-hook icon displayed on the PC screen. Clicking on off-hook establishes the call, and the conversation continues using the speaker and microphone included in the personal computer 142. One software product that provides a "soft telephone" on a PC using multimedia audio facilities, is a software phone client product provided by Ericsson that enables the user to place the received telephone calls from the user's PC. The significant advantage in this particular embodiment is that subscriber A can selectively redirect incoming calls back to his PC via the Internet gateway and take the phone call from party B without having to disrupt subscriber A's current Internet access.

While the foregoing describes what are considered to be preferred example embodiments of the invention, it is understood that various modifications may be made therein and that the invention may be implemented in various forms and embodiments, and that it may be applied in numerous applications, only some of which have been described. The following claims are intended to cover all such modifications and variations which fall within the true scope of the invention.

What is claimed is:

1. A call forwarding method comprising the steps of:

(a) receiving a request from a subscriber for a selective call forwarding service to be provided for a telephone number associated with the subscriber;

(b) establishing a subscriber call forwarding service record including the subscriber telephone number;

(c) registering a first out going trigger number and a first call forwarding number associated with the first outgoing trigger number in the subscriber call forwarding service record;

(d) determining when a communications device associated with the subscriber telephone number is engaged in communication with the first outgoing trigger number;

(e) detecting an incoming call directed to the communication device associated with the subscriber telephone number and automatically forwarding the incoming call to the first call forwarding number if the determination in step (d) is positive;

(f) determining when the communication device associated with the subscriber telephone number is currently engaged in communication with a telephone number other than the first outgoing trigger number; and (g) handling the incoming call in a manner other than forwarding the incoming call to the first call forwarding number if the determination in step (f) is positive.

2. The method in claim 1, wherein the establishing step (b) further includes:

prompting the subscriber to provide the first outgoing trigger number and the call forwarding number, wherein the subscriber responds to the voice prompts by depressing telephone keypad buttons.

3. The method in claim 1, wherein the subscriber activates the selective call forwarding service by entering a service activation code followed by an outgoing trigger number and a call forwarding number using a telephone keypad.

4. The method in claim 1, further comprising:

the subscriber activating the selective call forwarding service using a call forwarding service activation code entered in conjunction with a security code associated with the subscriber.

5. The method in claim 4, further comprising:

the subscriber deactivating the selective call forwarding service using a call forwarding service deactivation code entered in conjunction with a security code associated with the subscriber.

6. The method in claim 5, further comprising:

determining for an incoming call directed to the communication device associated with the subscriber telephone number whether the selective call forwarding service is activated or deactivated;

if the selective call forwarding service is activated, executing steps (d)–(g); and if the selective call forwarding service is deactivated, skipping steps (d)–(f), and executing step (g).

7. The method in claim 1, wherein the outgoing triggering number is an Internet access number.

8. The method in claim 7, wherein the outgoing triggering number is an access number to a local area network.

9. The method in claim 1, wherein the associated call forwarding number is a mobile telephone number.

10. The method in claim 1, wherein the associated call forwarding number is a subscriber's voice mailbox.

11. The method in claim 1, wherein the associated call forwarding number is any telephone number other than the subscriber telephone number.

12. The method in claim 1, wherein in step (g) the incoming call triggers one of the following:

generation of a busy signal, execution of a call waiting service, or execution of a call completion service.

13. The method in claim 1, wherein step (g) includes providing a service other than the selective call forwarding service.

14. The method in claim 1, wherein the subscriber registers a second outgoing trigger number and a second call forwarding number associated with the second outgoing trigger number in the subscriber call forwarding service record such that when the communication device associated with the subscriber telephone number is currently engaged in communication initiated to the second outgoing trigger number, an incoming call directed to the telephone line associated with the subscriber is automatically forwarded to the second call forwarding number.

15. The method in claim 14, wherein the first and second call forwarding numbers are the same.

16. The method in claim 1, comprising:

receiving a request from the subscriber to change information in the subscriber call forwarding record; and modifying the subscriber call forwarding record in response to an input received from the subscriber.

17. An information forwarding method comprising the steps of:

detecting when a subscriber activates a selective information forwarding service for a first communications network address corresponding to the subscriber;

receiving incoming information directed to the first communications network address;

automatically redirecting the incoming information to a second communications network address when a subscriber communications device associated with the first communications network address is currently involved in a communication with another communications device having a third address associated with the first and second addresses; and if the subscriber communications device is currently involved in communication with a communications device having an address other than the third address, performing a function other than automatically redirecting the incoming information to the second address.

18. The method in claim 17, wherein the first address is the subscriber's telephone number, the second address is a call forwarding telephone number, and the third address is a telephone number other than the subscriber's telephone number.

19. The method in claim 18, wherein the call forwarding telephone number includes a mobile telephone number or an address of a voice mail box associated with the subscriber.

20. The method in claim 18, wherein the outgoing number is a computer network access number.

21. The method in claim 20, wherein the subscriber communications device is a subscriber computer terminal having a microphone, a speaker, and speech conversion circuitry, and wherein the second address identifies a network server for processing the redirected information.

22. The method in claim 21, further comprising:

establishing a communication between the subscriber computer terminal and the incoming call, wherein the network server converts circuit-switched speech included in the redirected information into a packet-switched format and presents the packet-switched information to the subscriber computer terminal, and the subscriber terminal, upon accepting the information, converts the packet-switched information into an analog audio signal driving the speaker and converts audio signals received from the microphone into the packet-switch format for forwarding to the network server.

23. The method in claim 17, wherein the other function includes generating a busy signal or generating a message on a display screen of the computer indicating the presence of the incoming information.

24. A communications system, comprising:

a subscriber having a communications line associated with a subscriber number connectable to a communication device;

a calling party initiating a call to the subscriber communications line using the subscriber number; and a communications network having a plurality of nodes connected to plural communications lines for establishing call connections, the communications network including a switching node connected to the subscriber communications line having call routing circuitry and a computer controlling the call routing circuitry, wherein the computer includes a processor, a program memory, and a data memory and performs the following tasks in accordance with one or more programs stored in the program memory:

determining if an incoming call is directed to the subscriber number;

if an incoming call is directed to the subscriber number, accessing a data record stored in the data memory corresponding to the subscriber number that includes a first outgoing trigger telephone number and a corresponding first forwarding telephone number;

detecting if the subscriber communications device connected to the subscriber communications line is engaged in a communication involving the first outgoing trigger telephone number;

selectively re-routing the incoming call using the call routing circuitry to the corresponding forwarding number if the subscriber communications line is engaged in a communication involving the first outgoing trigger telephone number; and if the subscriber communications device is not engaged in a communication involving the first outgoing trigger telephone number, taking an action other than routing the incoming call to the corresponding forwarding number.

25. The communications system of in claim 24, wherein the other action includes performing a telecommunications service other than call forwarding.

26. The communications system in claim 24, wherein the call routing circuitry, computer, data memory, and program memory are located in a local telephone exchange connected to the subscriber communications line and to the communications network.

27. The communications system in claim 24, wherein the computer determines if the subscriber has activated or deactivated a selective call forwarding service.

28. The communications system in claim 24, wherein the first outgoing trigger number is an access number to a local area network.

29. The communications system in claim 24, wherein the call forwarding number is a mobile telephone number.

30. The communications system in claim 24, wherein the call forwarding number is a voice mail box.

31. The communications system in claim 24, wherein the other action includes one of the following:

generation of a busy signal, execution of a call waiting service, or execution of a call completion service.

32. The communications system in claim 24, wherein a second outgoing trigger telephone number and a second call forwarding number associated with the second trigger telephone number are stored in the data memory such that if the subscriber communications line is currently engaged in communication involving the second outgoing trigger telephone number, the computer automatically forwards an incoming call directed to the subscriber communications line to the second call forwarding number.

33. The communications system in claim 24, wherein the first outgoing trigger telephone number is an internetwork access telephone number, the subscriber communications device includes a subscriber computer terminal having a microphone, a speaker, and conversion circuitry for converting between analog and digital audio formats, and the corresponding call forwarding number is an internetwork computer.

34. The communications system in claim 33, wherein when the incoming call is forwarded to the internetwork computer, the internetwork computer establishes two way communication between the subscriber computer terminal and the calling party, the internetwork computer converts circuit-switched audio of the forwarded incoming call into IP formatted data packets and presents the IP data packets to the subscriber computer terminal, and the subscriber computer terminal converts the IP data packets into an analog audio signal to drive the speaker and converts audio received from the microphone into IP data packets which are forwarded to the internetwork computer.

35. A communications system, comprising:

a subscriber having a communications device connectable to a communications line associated with a subscriber number;

a calling party initiating a call to the subscriber communications line using the subscriber number; and an intelligent communications network having a plurality of nodes connected to plural communications lines for establishing call connections, the intelligent communications network including a node connected to the subscriber communications line having a service switching function detecting one or more trigger conditions and coupled to a service control function, wherein when the service switching function detects that an incoming call is directed to the subscriber number, the service switching function requests call handling instructions from the service control function, and the service control function instructs the service switching function to route the incoming call to a call forwarding number established by the subscriber only if the subscriber communications line is engaged in a communication with an outgoing trigger telephone number associated with the call forwarding number, and wherein the service control function further instructs the service switching function to take an action other than routing the incoming call to the corresponding forwarding number if the subscriber communications line is not engaged in a communication with the outgoing trigger telephone number.

36. The communications system in claim 35, wherein the computer determines if the subscriber has activated or deactivated a selective call forwarding service such that the incoming call is only routed to the call forwarding number when the selective call forwarding service is activated.

37. The communications system in claim 35, wherein the outgoing trigger telephone number is an Internet access number.

38. The communications system in claim 35, wherein the call forwarding number is a mobile telephone number.

39. The communications system in claim 35, wherein the call forwarding number is a voice mail box.

40. The communications system in claim 35, wherein the other action includes one of the following:

generation of a busy signal, execution of a call waiting service, or execution of a call completion service.

41. The communications system in claim 35, wherein another trigger number and another call forwarding number associated with the other number are established such that when the communications line associated with the subscriber is currently engaged in communication with the other outgoing trigger number, the control node instructs the switching node to automatically forward an incoming call directed to the communications line associated with the subscriber to the other call forwarding number.

42. The communications system in claim 35, wherein the node is connected to the subscriber communications line through a local telephone exchange.

43. The communications system in claim 35, further comprising:

an intelligent peripheral connected to the node for generating voice prompts to prompt entry of information from the subscriber regarding call forwarding.

44. The communications system in claim 35, wherein the outgoing trigger telephone number is an internetwork access telephone number, the subscriber communications device includes a subscriber computer terminal having a microphone, a speaker, and conversion circuitry for converting between analog and digital audio formats, and the corresponding call forwarding number is an internetwork computer.

45. The communications system in claim 44, wherein when the incoming call is forwarded to the internetwork computer, the internetwork computer establishes two way communication between the subscriber computer terminal and the calling party, the internetwork computer converts circuit-switched audio of the forwarded incoming call into IP formatted data packets and presents the IP data packets to the subscriber computer terminal, and the subscriber computer terminal converts the IP data packets into an analog audio signal to drive the speaker and converts audio received from the microphone into IP data packets which are forwarded to the internetwork server.

46. A method comprising:

detecting incoming information including a subscriber telephone number associated with a first subscriber telephone line;

determining that a personal computer is coupled to the Internet via the subscriber telephone line via an Internet access telephone number;

redirecting the incoming information to a processing node;

translating the subscriber telephone number into an Internet protocol (IP) address;

passing IP packets corresponding to the incoming information from the processing node to the personal computer using the translated IP address; and if the subscriber telephone line is not coupled to the Internet via the Internet access telephone number and is currently engaged in a communication involving another telephone number, redirecting the incoming information towards another communication line associated with the subscriber.

47. A method according to claim 46, wherein the incoming information includes speech and the processing node includes an Internet voice gateway which translates the speech into IP packets of speech.

48. A method according to claim 47, wherein the IP packets of speech are routed to the subscriber's personal computer by an Internet service provider access server using the IP address.

49. A method according to claim 46, further comprising:

indicating at the personal computer when the IP packets of speech are received, wherein a user currently operating the personal computer decides whether to respond to the incoming information by selecting an on-hook/off-hook option using the personal computer.

* * * * *